3,514,473
AMINOHYDROXYALKYL METHACRYLATES
Russell T. McFadden, Freeport, and Russell H. Cramm, Lake Jackson, Tex., assignors to The Dow Chemical Company, Midland, Mich., a corporation of Delaware
No Drawing. Filed Aug. 2, 1967, Ser. No. 657,772
Int. Cl. C07d 87/36, 5/16; C07c 93/00
U.S. Cl. 260—347.4      8 Claims

ABSTRACT OF THE DISCLOSURE

The reaction of glycidyl methacrylate with a secondary amine produce novel 3-amino-2-hydroxyalkyl methacrylate monomers useful in preparing copolymers having improved adhesion and reactive hydroxyl groups for crosslinking, copolymer modification and the like.

---

The present invention relates to novel vinyl monomers containing both tertiary amino and hydroxyl groups. More particularly, the invention relates to aminohydroxyalkyl methacrylate monomers which are useful in preparing a variety of polymers for coatings, adhesives, and the like.

Accordingly, this invention provides for novel vinyl monomers having the following formula:

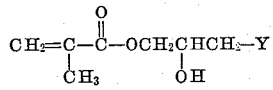

wherein Y is morpholino or

$R_1$ may be aryl, cyclopentyl, cyclohexyl, tetrahydrofurfuryl, or alkyl groups having 1 to 15 carbon atoms, and $R_2$ may be an alkyl group having from 1 to 15 carbon atoms. It is to be understood that the monomers of this invention may contain up to about 10% by weight of the 2-amino-3-hydroxyalkyl methacrylate.

These compounds are conveniently prepared by reacting glycidyl methacrylate with a secondary amine. The reaction is generally carried out at 50–80° C. and preferably from 60–70° C. While there is no detrimental effect to conducting the reaction at temperatures below 50° C., the reaction proceeds rather slowly. Generally, if the reaction is conducted above 80° C. the products begin to darken in color and polymerization begins to occur. The reaction is run at the autogenous pressure but super atmospheric pressures may be employed if desired or needed. The time required for completion of the reaction is dependent upon the temperature and the particular secondary amine employed. Generally, the reaction takes from about 3 to about 24 hours for complete reaction. The reaction may be run in an inert solvent, but usually the amine reactants acts as the solvent for the reaction.

The secondary amine is employed in a slight molar excess to ensure reaction of all the glycidyl groups present, although larger quantities of the amine may be employed if desired. From a practical standpoint an excess of amine is more readily removed from the product than is an excess of glycidyl methacrylate.

Suitable secondary amines which may be employed in this invention include dialkyl amines containing from 1 to 15 carbon atoms such as diethyl amine, dipropyl amine, diisopropyl amine, didodecyl amine, and mixed dialkyl amines such as methyl ethyl amine; mixed aliphatic aromatic amines such as N-methyl aniline; and heterocycle amines such as morpholine, and the like.

Other glycidyl unsaturatred monomers such as allyl glycidyl ether and the like are suitable for the preparation of monomers having a pendant 3-amino-2-hydroxy alkyl group.

The following non-limiting examples will further illustrate the present invention. In the examples the amine equivalent weight is determined by titrating a weighed sample dissolved in ethyl alcohol with 1.0 N HCl.

EXAMPLE 1

Reaction with diethyl amine

In a 5-liter spherical glass reactor equipped for reflux, agitation, temperature control, and continuous reactant addition was placed 800 gms. (11.0 moles) of diethyl amine. Stirring and heating were begun until the amine refluxed; then the addition of 1,420 gm. (10.0 moles) of glycidyl methacrylate was begun at a rapid dropping rate. As the ester was added the reflux temperature of the reactor rose until it reached 80° C., and was controlled thereat. All of the glycidyl methacrylate was added in 3 hours and then the mixture was heated at 80° C. for an additional 3 hours. While the mixture was still hot, it was subjected to a vacuum of 50 mm. Hg to remove unreacted diethyl amine. The crude product was stabilized by adding 50 gm. of N,N'-diphenyl-p-phenylenediamine and was then transferred to a flash still.

The pressure in the flash still was reduced to about 3 mm. Hg pressure and the crude ester was then heated. The bulk of the monomer distilled as a colorless oil at 110–115° C. at about 0.1 mm. of pressure. A typical sample of this distillate had the following properties:

Refractive index at 24° C.—1.4585–1.4590
Color—None
Amine equivalent weight—213 (theory 215)
Boiling point—110–112° C. at 0.10 mm.
Elemental composition (percent)—C, 60.3 (theory 60.4); H, 9.73 (theory 9.84); O, 22.1 (theory 22.3)
Density at 24° C.—0.975 gm./ml.

The infra-red absorption spectrum was in agreement with that predicted from spectra of known similar compounds such as hydroxypropyl methacrylate and dimethylaminoethyl methacrylate.

EXAMPLE 2

Reaction with dipropyl amine

In a manner similar to that of Example 1, the N,N-dipropyl derivative was prepared from 1000 gms. (9.9 moles) of dipropyl amine and 1,280 gms. (9.0 moles) of glycidyl methacrylate. The product was distilled and had the following properties:

Refractive index at 24° C.—1.4565–1.4570
Color—None
Amine equivalent weight—244 (theory 243)
Boiling point—140–142° C. at 0.10 mm.
Elemental composition (percent)—C, 64.0 (theory 64.2); H, 10.5 (theory 10.4); O, 19.3 (theory 19.7)
Density at 24° C.—0.944 gms./ml.

EXAMPLE 3

Reaction with dibutyl amine

The N,N-dibutyl derivative was prepared in a similar manner as described in Example 1. The product was distilled and had the following properties:

Refractive index at 24° C.—1.4575–1.4580
Color—None
Amine equivalent weight—274 (theory 271)
Boiling point—155–160° C. at 0.1 mm.
Elemental composition (percent)—C, 64.3 (theory 66.4); H, 10.7 (theory 10.8); O, 18.2 (theory 17.8)
Density at 24° C.—0.886 gms./ml.

EXAMPLE 4

Reaction with diisopropyl amine

The N,N-diisopropyl derivative was prepared in a manner similar to that of Example 1, except that the mixture was digested at 90–110° C. for ten hours to complete the reaction. The crude product was distilled and had the following properties:

Refractive index at 24° C.—1.4600
Color—None
Amine equivalent weight—249 (theory 245)
Boiling point—124–127° C. at 0.4 mm.
Elemental composition (percent)—C, 63.8 (theory 64.2); H, 10.4 (theory 10.4); O, 20.1 (theory 19.7)
Density at 24° C.—0.975 gm./ml.

EXAMPLE 5

Reaction with didodecyl amine

The N,N-didodecyl derivative was prepared by mixing 47 gms. (0.33 mole) of glycidyl methacrylate and 118 gms. (0.33 mole) of didodecyl amine and heating the mixture 17½ hours at 50° C. followed by 2 hours at 80° C. After vacuum stripping at 60° C. for four hours the product was a very light yellow oil having the following properties:

Refractive index at 24° C.—1.4634
Amine equivalent weight—530
Density at 24° C.—0.898 gms./cc.

The infra-red absorptions spectrum was essentially identical to those of the lower homologs, except that the C—H absorptions at 3.42 and 350μ were much stronger.

EXAMPLE 6

Reaction with N-ethyl aniline

In a citrate bottle were charged 92.9 gms. of N-ethyl aniline and 98.0 gms. of glycidyl methacrylate. The bottles were sealed and tumbled for 18 hours at 70° C. The contents were then distilled under vacuum and a major fraction was obtained with the following properties:

Boiling point range—140–145° C. at 0.5 mm.
Amine equivalent weight—270 (theory 263)
Elemental composition (percent)—C, 67.2 (theory 68.5); H, 7.96 (theory 8.0); O, 18.5 (theory 18.5)

The infra-red spectrum was in agreement with the expected structure.

EXAMPLE 7

Reaction with N-methyl tetrahydrofurfuryl amine

In a manner similar to that of Example 6, 83.9 gms. of N-methyl tetrahydrofurfuryl amine was mixed with 93.0 gms. of glycidyl methacrylate. The major fraction recovered after reaction had the following properties:

Boiling point range—137–141° C. at 0.5 mm.
Amine equivalent weight—260 (theory 257)
Elemental composition (percent)—C, 58.9 (theory 60.7); H, 9.18 (theory 8.95); O, 24.4 (theory 24.9)

The infra-red spectrum was in agreement with the expected structure.

The methacrylate ester monomers of this invention offer a convenient and practical way to introduce tertiary amino nitrogen and hydroxy groups into a copolymer system by vinyl polymerization with other monomers or by well known graft polymerization techniques.

The hydroxy group provides improved adhesion of the copolymer as well as a reactive site for further copolymer modification. Adhesiveness of the copolymers and coatings are also improved by the incorporation of the tertiary amino group into the polymer structure.

What is claimed is:

1. A 3-amino-2-hydroxy alkyl ester of methacrylic acid having the formula

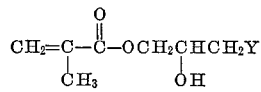

wherein Y is morpholino or

$R_1$ is cyclopentyl, cyclohexyl, tetrahydrofurfuryl, aryl or an alkyl group of 1 to 15 carbon atoms and $R_2$ is an alkyl group of 1 to 15 carbon atoms.

2. The methacrylic acid ester of claim 1 wherein Y is

and $R_1$ and $R_2$ are ethyl radicals.

3. The methacrylic acid ester of claim 1 wherein Y is

and wherein $R_1$ and $R_2$ are n-propyl radicals.

4. The methacrylic acid ester of claim 1 wherein Y is

and $R_1$ and $R_2$ are n-butyl radicals.

5. The methacrylic acid ester of claim 1 wherein Y is

and $R_1$ and $R_2$ are isopropyl radicals.

6. The methacrylic acid ester of claim 1 wherein Y is

and $R_1$ and $R_2$ are dodecyl radicals.

7. The methacrylic acid ester of claim 1 wherein Y is

and $R_1$ is phenyl and $R_2$ is ethyl.

8. The methacrylic acid ester of claim 1 wherein Y is

and $R_1$ is tetrahydrofurfuryl and $R_2$ is methyl.

References Cited

UNITED STATES PATENTS

| | | | |
|---|---|---|---|
| 2,138,763 | 11/1938 | Graves | 260—486 XR |
| 2,379,381 | 6/1945 | Shelton et al. | 260—486 XR |
| 2,606,810 | 8/1952 | Erickson. | |
| 2,630,429 | 3/1953 | Hwa. | |
| 3,272,712 | 9/1966 | Kalopissis et al. | |
| 3,329,706 | 7/1967 | Sobolev | 260—486 |

LORRAINE A. WEINBERGER, Primary Examiner

A. P. HALLUIN, Assistant Examiner

U.S. Cl. X.R.

260—86.1, 247.2, 486, 885